US011121381B2

(12) United States Patent
Suzuki et al.

(10) Patent No.: US 11,121,381 B2
(45) Date of Patent: Sep. 14, 2021

(54) METHOD FOR MANUFACTURING FUEL CELL STACK

(71) Applicant: TOYOTA JIDOSHA KABUSHIKI KAISHA, Toyota (JP)

(72) Inventors: Shunsuke Suzuki, Nisshin (JP); Tomokazu Hayashi, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 105 days.

(21) Appl. No.: 16/295,297

(22) Filed: Mar. 7, 2019

(65) Prior Publication Data

US 2019/0288298 A1    Sep. 19, 2019

(30) Foreign Application Priority Data

Mar. 14, 2018   (JP) .............................. JP2018-047144

(51) Int. Cl.
| | |
|---|---|
| *H01M 8/0221* | (2016.01) |
| *H01M 8/1004* | (2016.01) |
| *B32B 9/04* | (2006.01) |
| *H01M 8/2465* | (2016.01) |

(52) U.S. Cl.
CPC .......... *H01M 8/0221* (2013.01); *B32B 9/045* (2013.01); *H01M 8/1004* (2013.01); *H01M 8/2465* (2013.01); *B32B 2307/00* (2013.01); *B32B 2457/18* (2013.01)

(58) Field of Classification Search
CPC combination set(s) only.
See application file for complete search history.

(56) References Cited

U.S. PATENT DOCUMENTS

2005/0208361 A1*  9/2005  Enjoji ................ H01M 8/0267
                                                                    429/483

FOREIGN PATENT DOCUMENTS

| JP | 2009-43604 A | 2/2009 |
| JP | 2014-86263 A | 5/2014 |
| JP | 2015-130275 A | 7/2015 |

* cited by examiner

*Primary Examiner* — Ula C Ruddock
*Assistant Examiner* — Sarika Gupta
(74) *Attorney, Agent, or Firm* — Oliff PLC

(57) ABSTRACT

Provided is a method for manufacturing a fuel cell stack that can manufacture the fuel cell stack efficiently, can improve the precision for joining and can improve the power generation efficiency. The method for manufacturing a fuel cell stack repeatedly stacks a separator, an electrode assembly and a separator in this order in accordance with the laminated structure of the fuel cell stack to be manufactured to manufacture the fuel cell stack. When the electrode assembly is stacked on the separator, the method pressurizes the electrode assembly stacked on the separator and applies laser light to the electrode assembly to join the resin frame of the electrode assembly to the separator. When the separator is stacked on the electrode assembly, the method pressurizes the separator stacked on the electrode assembly and applies laser light to the separator to join the separator to the resin frame of the electrode assembly.

3 Claims, 6 Drawing Sheets

METHOD FOR MANUFACTURING FUEL CELL STACK

CROSS REFERENCE TO RELATED APPLICATIONS

The present application claims priority from Japanese patent application JP 2018-047144 filed on Mar. 14, 2018, the content of which is hereby incorporated by reference into this application.

BACKGROUND

Technical Field

The present disclosure relates to a method for manufacturing a fuel cell stack including a laminate of a plurality of single cells.

Background Art

JP 2009-43604 A, for example, discloses a conventional method for manufacturing a fuel cell stack of this type. This method firstly prepares a membrane electrode assembly including an electrode layer on either side of a polymer electrolyte membrane. The method then disposes a pair of separators over this membrane electrode assembly via gaskets so that the separators sandwich the membrane electrode assembly and then bonds the gaskets by laser welding to manufacture a single cell. Next the method stacks this prepared plurality of single cells one by one to manufacture a fuel cell stack.

SUMMARY

The method for manufacturing a fuel cell stack described in JP 2009-43604 A includes the step of manufacturing single cells and the step of stacking a plurality of these single cells to manufacture a fuel cell stack that are separately performed at different places. This means that the method conveys the manufactured single cells one by one to a different place and then stacks them in turn, and so it takes a long time to manufacture a fuel cell stack.

More particularly each single cell is a laminated structure of a pair of separators and a membrane electrode assembly, and if these components of the laminated structure are displaced slightly during the manufacturing of each single cell, it takes a long time to stack these single cells precisely during the manufacturing of a fuel cell stack.

To manufacture a fuel cell stack, the laminate of single cells is pressurized at one time in the stacking direction. If the laminate includes a single cell that warps slightly, for example, excessive load will be applied at the part of joining the separators and the membrane electrode assembly, and this may degrade the reliability of the resultant fuel cell stack.

In view of these problems, the present disclosure provides a method for manufacturing a fuel cell stack reliably and effectively.

In view of the above problems, a method for manufacturing a fuel cell stack according to the present disclosure manufactures a fuel cell stack including a laminate of a plurality of single cells, each single cell including an electrode assembly sandwiched between a pair of separators, the electrode assembly including: a membrane electrode assembly having both faces on each of which a gas diffusion layer is stacked; and a resin frame fixed to the membrane electrode assembly so as to wrap around periphery of the membrane electrode assembly. The method includes: repeatedly stacking the separator, the electrode assembly and the separator in this order in accordance with a laminated structure of the fuel cell stack to be manufactured to manufacture the fuel cell stack. When the electrode assembly is stacked on the separator, the method pressurizes the electrode assembly stacked on the separator and applies laser light to the electrode assembly to melt resin of the resin frame to join the electrode assembly to the separator. When the separator is stacked on the electrode assembly, the method pressurizes the separator stacked on the electrode assembly and applies laser light to the separator to melt resin of the resin frame via the separator to join the separator to the electrode assembly.

According to the present disclosure, when the electrode assembly is stacked on the separator, the method pressurizes the electrode assembly stacked on the separator and applies laser light to the electrode assembly to join the resin frame of the electrode assembly to the separator. When the separator is joined to the electrode assembly, the method pressurizes the separator stacked on the electrode assembly and applies laser light to the separator to heat the separator and join the separator with the resin frame of the electrode assembly. In this way, the method joins these members one by one while pressurizing them, and so can suppress warping or the like due to heat during joining and can join these members while keeping them in position precisely. Additionally the method stacks these electrode assemblies and separators one by one to manufacture single cells while manufacturing the fuel cell stack as well, and so can manufacture the fuel cell stack efficiently.

In the method for manufacturing a fuel cell stack as stated above according to an embodiment, when the separator is stacked on the separator making up the single cell, the method further includes the step of disposing a conductive assembly between the separator to be stacked and the separator making up the single cell to join the separators via the conductive assembly. The conductive assembly includes a conductive member and a resin frame that is fixed to the conductive member so as to wrap around the periphery of the conductive member. When the separators are joined, the method pressurizes the conductive assembly stacked on the separator making up the single cell and applies laser light to the resin frame of the conductive assembly to join the resin frame of the conductive assembly with the separator. When the separator is joined to the conductive assembly, the method pressurizes the separator stacked on the conductive assembly and applies laser light to the separator to join the separator with the resin frame of the conductive assembly.

According to this aspect, when the separator to make up the next single cell is stacked on the separator making up the single cell, the method joins these separators via a conductive assembly. The conductive assembly, including the conductive member, can establish continuity between these separators of the single cells disposed on both sides of the conductive assembly. The resin frame of the conductive assembly has a shape similar to that of the resin frame of the electrode assembly, whereby the fuel cell stack can be manufactured at lower cost.

The method for manufacturing a fuel cell stack of the present disclosure can manufacture the fuel cell stack efficiently and precisely and can improve the power generation efficiency.

DETAILED DESCRIPTION

The following describes one embodiment of a method for manufacturing a fuel cell stack according to the present disclosure in details, with reference to the drawings. The following firstly describes a fuel cell stack that is manufactured by the method for manufacturing a fuel cell stack according to the present embodiment in details.

Referring to FIGS. 1 to 5, the fuel cell stack 1 manufactured by this method includes a laminated structure (stacked structure) of a plurality of single cells 10 each making up one unit of the fuel cell stack 1. More specifically the fuel cell stack includes 100 pieces of single cells, for example. The fuel cell stack 1 of the present embodiment is of a solid polymer type.

Figure 1:
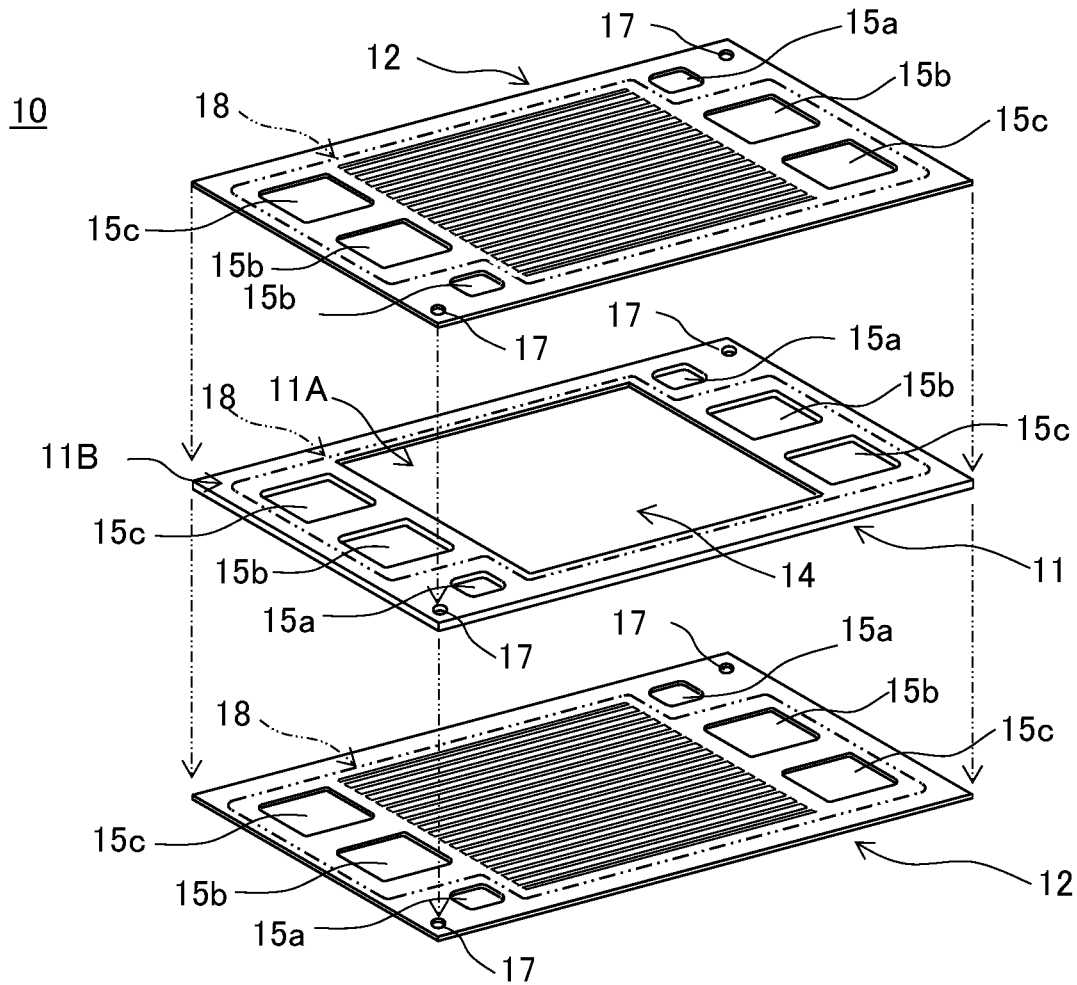
FIG. 1 is an exploded perspective view of a single cell of a fuel cell stack that is manufactured by the method for manufacturing a fuel cell stack according to the present embodiment.

As shown in FIG. 1, each single cell 10 making up the fuel cell stack 1 includes an electrode assembly 11. The electrode assembly 11 includes a sheet-like membrane electrode assembly having a gas diffusion layer on either side, and so this electrode assembly may be called a Membrane Electrode & Gas diffusion layer Assembly (MEGA) (hereinafter this is called a MEGA) 11A. The electrode assembly 11 also includes a resin frame 11B that is fixed to the MEGA 11A so as to wrap around the periphery of the MEGA 11A.

The single cell 10 includes separators 12 and 12 that are disposed on both sides of the electrode assembly 11, i.e., the electrode assembly 11 is sandwiched between the separators 12 and 12. In this electrode assembly 11, the MEGA 11A includes a polymer electrolyte membrane 1 la having an anode electrode (fuel electrode) 11b on one side and a cathode electrode (air electrode) 11c on the other side, and the MEGA also includes gas diffusion layers 11d and 11d so as to cover these electrodes.

The polymer electrolyte membrane 11a may be a proton-conducting ion-exchange membrane made of solid polymer, and the anode electrode 11b and the cathode electrode 11c may be made of a porous carbon material loaded with a catalyst, such as platinum. The gas diffusion layers 11d include a conductive member having gas permeability, including a carbon porous body, such as carbon paper or carbon cloth, or a metal porous body, such as metal mesh or foam metal.

As stated above, the resin frame 11B is fixed to the MEGA 11A so as to wrap around the periphery of the MEGA. This resin frame is made of thermoplastic resin, such as polypropylene or polyethylene, and has a rectangular outer shape. This resin frame is to prevent short-circuiting between the separators 12 and 12. The resin frame 11B has a function of preventing fluid (fuel gas, oxidant gas or cooling medium) flowing through the single cell 10 from leaking to the outside.

The electrode assembly 11 has an electricity-generation section 14 at a center part of the inner periphery that is not covered with the resin frame 11B, and this electricity-generation section 14 corresponds to the MEGA 11A. The resin frame 11B has openings on both sides in the longitudinal direction so as to transmit fuel gas (specifically hydrogen gas), oxidant gas (e.g., air) and cooling medium (e.g., cooling water) individually. More specifically the resin frame 11B has a pair of first openings 15a and 15a for fuel gas, a pair of second openings 15b and 15b for oxidant gas and a pair of third openings 15c and 15c for cooling medium. Note here that one of the openings as a pair for each type of fluid is to feed the fluid into the electricity-generation section 14 and the other opening is to transmit the fluid flowing out from the electricity-generation section 14.

The first openings 15a and 15a for fuel gas have a size in cross section that is smaller than that of the second openings 15b and 15b. This is because while these first openings 15a receive hydrogen gas of high purity as the fuel gas, and the second openings 15b receive air containing oxygen gas (atmospheric air) as the oxidant gas. The first openings 15a and 15a for fuel gas are diagonally disposed at the rectangular electrode assembly 11 across the electricity-generation section 14. Similarly the second openings 15b and 15b for oxidant gas also are diagonally disposed at the rectangular electrode assembly 11 across the electricity-generation section 14.

The separators 12 and 12 include metal thin plates, which are manufactured by press-forming of a thin plate made of titanium alloy or stainless steel, for example. These separators 12 have the same outer shape as the electrode assembly 11 including the MEGA 11A and the resin frame 11B. The separators 12 and 12 disposed on both sides of the electrode assembly 11 basically have the same structure, and similarly to the electrode assembly 11, the separators each have openings 15a to 15c on both sides in the longitudinal direction, the openings having the same shapes as those of the electrode assembly to transmit fuel gas, oxidant gas and cooling medium.

Figure 3:
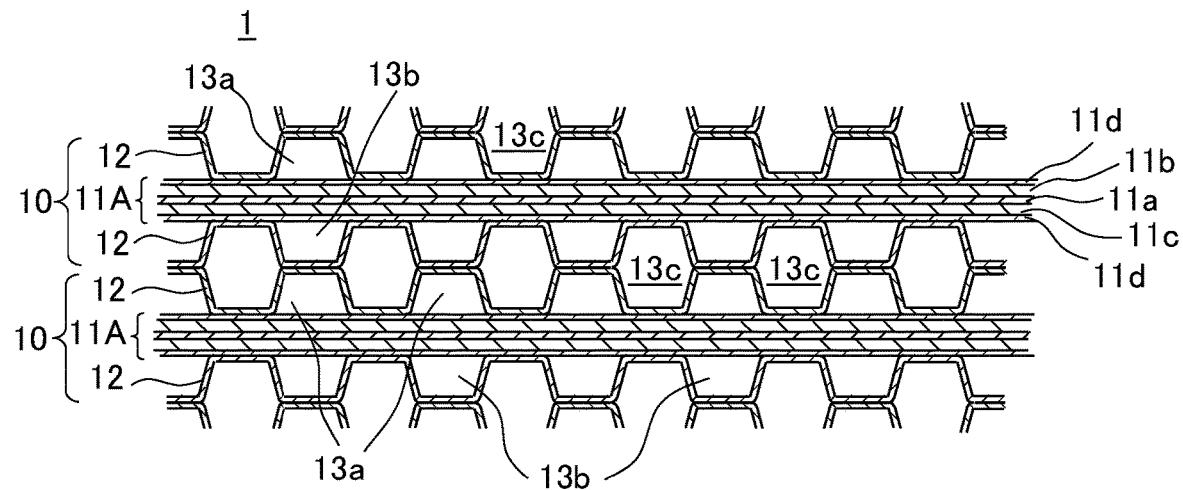
FIG. 3 is a cross-sectional view of a major part of the single cells of the fuel cell stack shown in FIG. 2 that are stacked.
Figure 4:
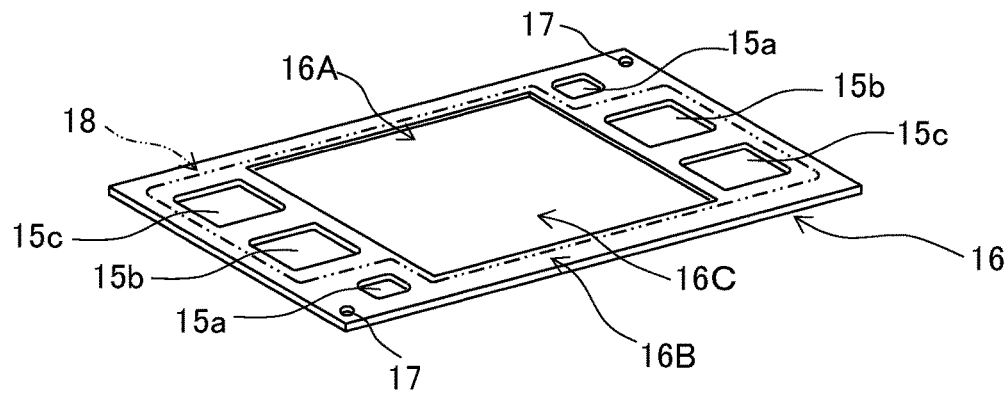
FIG. 4 is a perspective view of a conductive assembly without electrodes.

As shown in FIG. 3, each separator 12 has a major part at the center, where a lot of ridges and furrows as grooves are formed along the longitudinal direction, for example, to define conduits for fuel gas, oxidant gas and cooling medium. Specifically the major part of each separator 12 has a corrugated pattern, and each wave shape of the corrugated pattern is an isosceles trapezoid. The isosceles trapezoid has a flat top whose angles of both ends are equal, and the both ends are angular. That is, the shape of the major part of each separator 12 is substantially the same viewed from its surface side and from its rear-face side. The tops of the separator 12 are in planar contact with the corresponding gas diffusion layer 11d of the MEGA 11A.

The gas diffusion layer 11d facing the anode electrode 11b and the corresponding separator 12 define gas conduits 13a, which are for flowing fuel gas. The gas diffusion layer 11d facing the cathode electrode 11c and the corresponding separator 12 define gas conduits 13b, which are for flowing oxidant gas. When fuel gas is supplied to the gas conduits 13a on one side of the single cell 10 and oxidant gas is supplied to the gas conduits 13b on the other side, they cause an electrochemical reaction in this single cell 10 to generate electrical power.

A single cell 10 and another neighboring single cell 10 are disposed so that their anode electrode 11b and cathode electrode 11c are opposed and the tops of the separators 12 of these neighboring single cells 10 are in planar contact with each other. Alternatively these separators 12 and 12 may in planar contact with each other via a conductive assembly 16 described later. These separators 12 and 12 of the neighboring two single cells 10 and 10 that are in planar contact define spaces, and the spaces define coolant passages 13c to flow cooling medium to cool the single cells 10. Note here that a seal member (not illustrated) is disposed between these separators 12 and 12 in the vicinity of their outer edges.

The electrode assembly 11 includes two guide holes 17 and 17 that are disposed diagonally across the electricity-generation section 14. The separator 12 also includes two guide holes 17 and 17 that are disposed diagonally across the electricity-generation section 14. These guide holes 17 are formed as through-holes at the same position, through which a guide shaft of the manufacturing device described later can pass. The guide holes are not limited to two positions and may be disposed at three or more positions.

Figure 2:
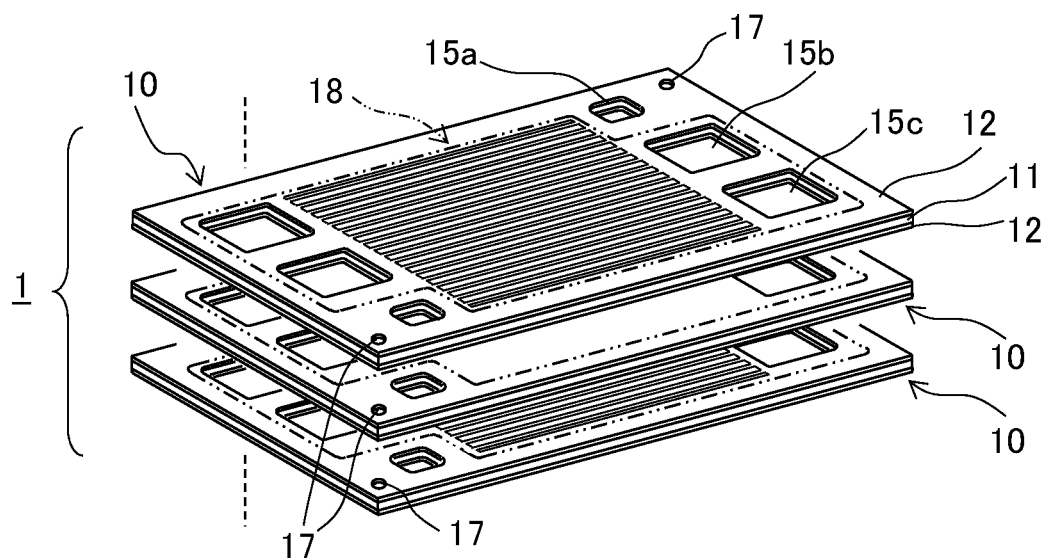
FIG. 2 is an exploded perspective view of each single cell of the fuel cell stack in FIG. 1.

FIGS. 2 and 3 illustrate the separators 12 and 12 that are in direct contact. In another example, a conductive assembly 16 may be disposed between the separators 12 and 12 as stated above (see FIGS. 4 and 5).

The conductive assembly 16 basically has the same shape as that of the electrode assembly 11. The conductive assembly 16 includes a conductive member 16A and a resin frame 16B that is fixed to the conductive member 16A so as to wrap around the periphery of the conductive member 16A. The conductive member 16A may be ion conductive or electron conductive, and may thus be made of any conductive material, such as polymer electrolyte membrane or carbon paper without limitations. For example, the conductive member 16A may be made of metal that is resistant well to corrosion, such as stainless steel and titanium alloy, because cooling medium flows therethrough. Examples of such a conductive member 16A include a metal thin plate or expanded metal. The conductive assembly 16 also has pairs of openings 15a to 15c of the same shape at a part of the rectangular resin frame 16B to flow fuel gas, oxidant gas and cooling medium.

Figure 5:
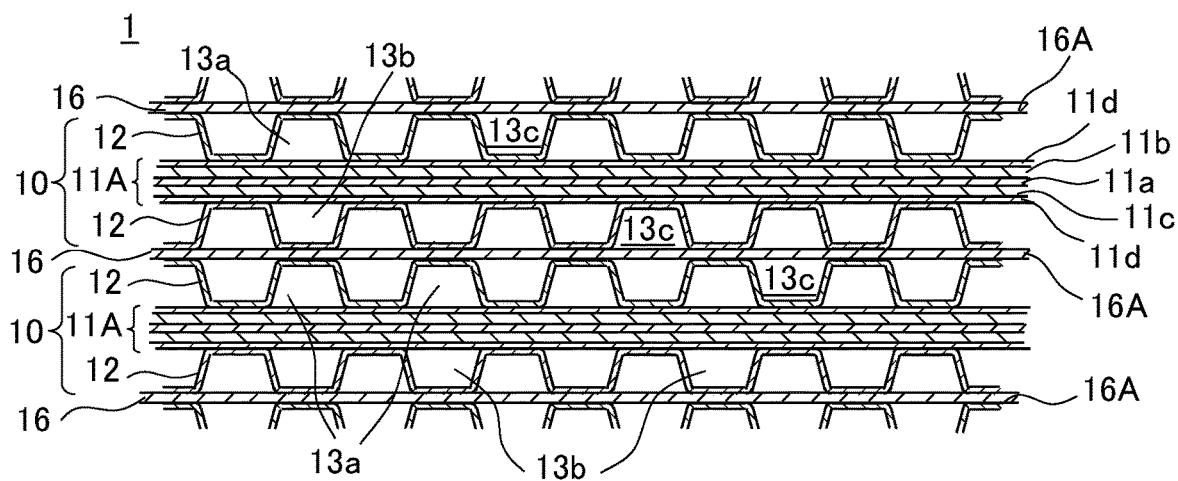
FIG. 5 is a cross-sectional view of a major part of the laminate including the conductive assembly shown in FIG. 4.

The conductive assembly 16 includes the conductive member 16A that is exposed, and the conductive member is disposed at a part 16C that comes in contact with the electricity-generation section 14 of the electrode assembly 11. As shown in FIG. 5, the configuration including such a conductive assembly 16 has the separators 12 and 12 of the neighboring single cells 10 on both sides of the conductive assembly 16, so that the coolant passages 13c for cooling medium are divided into two by the conductive member 16A of the conductive assembly 16.

As shown in FIGS. 1 and 2, the resin frame 11B of the electrode assembly 11 and the separators 12 to be joined with the resin frame have joining lines 18 as joining parts for joining of them. In the structure including the conductive assembly 16 shown in FIG. 4 as well, the resin frame 16B of the conductive assembly 16 and the separators 12 to be joined with the resin frame have joining lines 18 as joining parts for joining of them. The joining line 18 is a part where resin of the resin frame 11B melts by laser light R applied from a laser joining device 24 of the manufacturing device 20 described later to join the electrode assembly 11 and the separators 12. The same goes for the joining lines 18 of the conductive assembly 16 and the separators 12.

The joining line 18 is formed by applying laser light R so as to enclose the surrounding of the electricity-generation section 14 inside of the resin frame 11B of the electrode assembly 11, the second openings 15b and 15b for flowing oxidant gas and the third openings 15c and 15c for flowing cooling medium. The first openings 15a and 15a to flow hydrogen gas as fuel gas are located outside of the joining line 18. The joining line 18 is formed intermittently from the first opening 15a to the electricity-generation section 14 between the face on the side of the anode electrode 11b and the corresponding separator 12 so as to allow fuel gas to flow therethrough. Such an intermittent part of the joining line 18 defines a conduit (not illustrated) to flow fuel gas.

In this way the joining line 18 divides the first openings 15a from the second openings 15b and the third openings 15c. This can prevent fuel gas (specifically hydrogen gas) flowing through the first openings 15a from transmitting the seal member (not illustrated) at the second openings 15b and the third openings 15c and mixing with oxidant gas or cooling medium flowing there. The present embodiment divides the first openings 15a from the second openings 15b and the third openings 15c with the joining line 18. In another example, fuel gas, which does not transmit the seal member, may be used and these openings then may be formed within the joining line 18.

Figure 6:
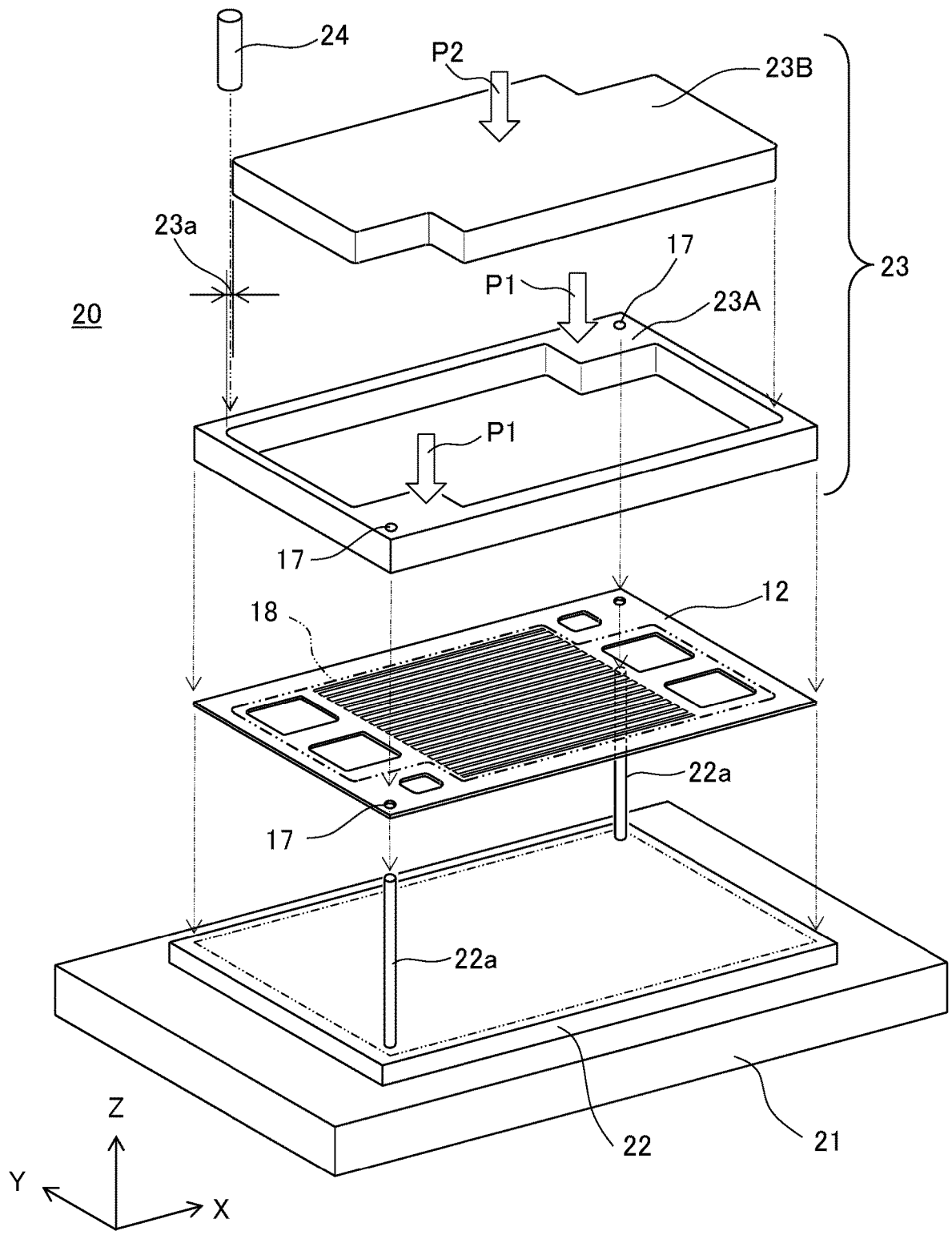
FIG. 6 is an exploded perspective view of a manufacturing device to manufacture the fuel cell stack shown in FIGS. 1 to 5.
Figure 7:
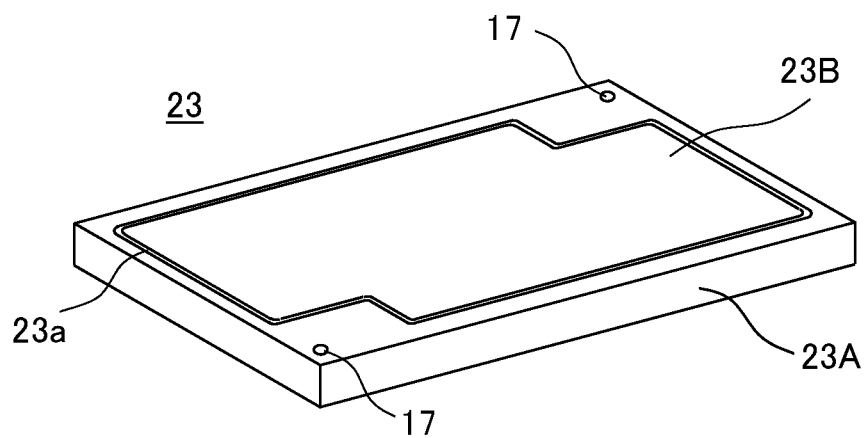
FIG. 7 is a perspective view of a pressurizing member of the manufacturing device to manufacture the fuel cell stack shown in FIG. 5.
Figure 8:
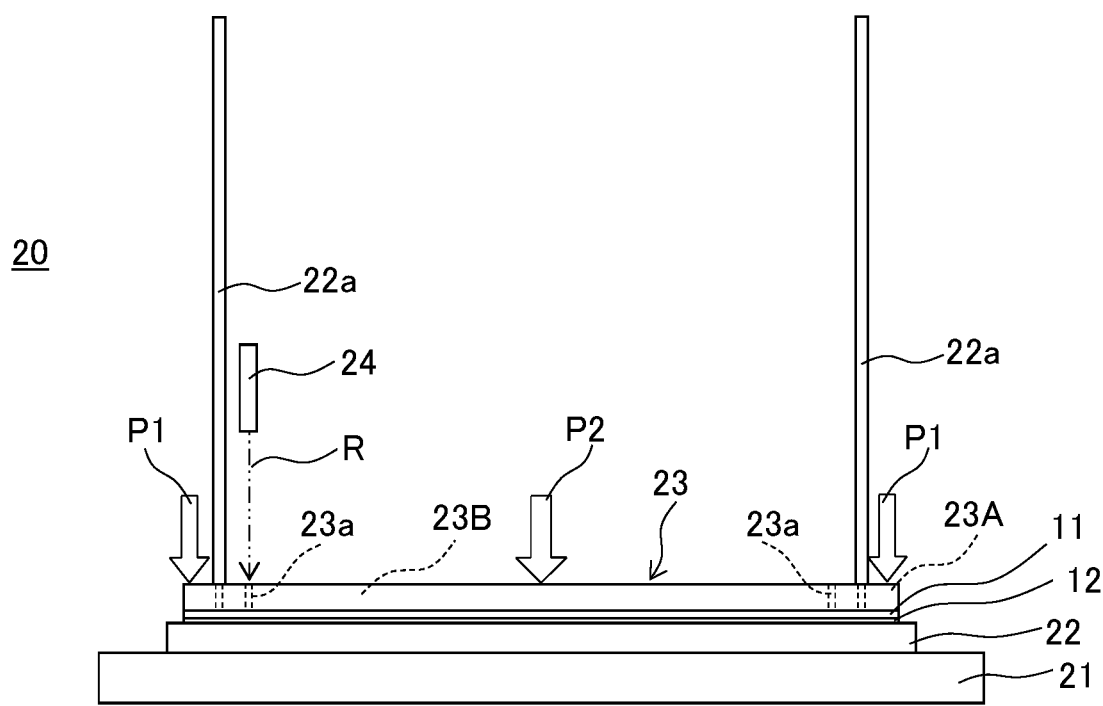
FIG. 8 is an elevation view showing the process of the method for manufacturing a fuel cell stack according to the present embodiment.

Referring next to FIGS. 6 to 8, the following describes the manufacturing device 20 to manufacture the fuel cell stack 1 in details. The following describes a method for manufacturing the fuel cell stack 1 having the structure shown in FIG. 5. The manufacturing device 20 includes an XY stage 21 as a base, a mount 22 disposed on and fixed to the XY stage 21, a pressurizing member 23 that is mounted to two guide shafts 22a and 22a standing vertically from the mount 22 so as to move up and down, and a laser joining device 24.

The XY stage 21 is a device that can move the mount 22 in direction X and direction Y via a mechanism, such as a stepping motor or a ball screw. The XY stage 21 therefore can move the separator 12, the electrode assembly 11 and the conductive assembly 16 on the mount 22 horizontally together with the mount.

The mount 22 is attached to the XY stage 21. The mount 22 has a rectangular shape, and includes the two guide shafts 22a and 22a that stand vertically at two diagonal positions. The separator 12, the electrode assembly 11 and the conductive assembly 16 can be mounted precisely at a predetermined position on the mount 22 by inserting these guide shafts 22a and 22a into their guide holes 17 and 17.

The pressurizing member 23 is a metal plate having a rectangular shape in plan view, and has a substantially same shape as those of the electrode assembly 11, the separator 12 and the conductive assembly 16. The pressurizing member 23 has a groove 23a that is continuously formed without breaks so as to allow laser light R from the laser joining device 24 to pass through. This groove 23a has a shape corresponding to shape of the joining line 18 as stated above. In other words, the pressurizing member 23 is divided by the groove 23a into an outer part 23A to pressurize a part outside of the joining line 18 and an inner part 23B to pressurize a part inside of the joining line 18.

The pressurizing member 23 includes a hydraulic cylinder, for example, not illustrated to pressurize the separator 12, the electrode assembly 11 and the conductive assembly 16 disposed on the mount 22 downward (−Z direction). Specifically the pressurizing member 23 includes a hydraulic cylinder to pressurize the outer part 23A downward with pressure P1 and a hydraulic cylinder to pressurize the inner part 23B downward with pressure P2. The inner part 23B internally includes a cooling passage (not illustrated) to cool the electricity-generation section 14 of the electrode assembly 11 when the electricity-generation section is heated by laser light. This can cool the electricity-generation section 14 during joining and can suppress the deterioration of performance of the metal catalyst included in the anode electrode 11b and the cathode electrode 11c due to excessive heating of these electrodes.

The outer part 23A of the pressurizing member 23 includes two guide holes 17 and 17 that are disposed diagonally. The outer part 23A of the pressurizing member 23 therefore can move up and down by a hydraulic cylinder, for example, by inserting the guide shafts 22a and 22a into the guide holes 17 and 17. The inner part 23B can move up and down by another hydraulic cylinder different from the hydraulic cylinder for the outer part 23A so that the groove 23a on the inner periphery of the outer part 23A can keep a predetermined gap. The operation of these hydraulic cylinders can pressurize the separator 12, the electrode assembly 11 or the conductive assembly 16 located at the uppermost layer.

The laser joining device 24 issues laser light R from the light source to join the separator 12 and the electrode assembly 11 or the conductive assembly 16. The laser light R is applied through the groove 23a of the pressurizing member 23 so that one of the separator 12, the electrode assembly 11 and the conductive assembly 16 stacked is irradiated with the laser light R from the above for joining it with another member.

For instance, when the separator 12 before joining is located at the uppermost layer and the electrode assembly 11 is located below, laser light R applied along the groove 23a heats the separator 12. This can indirectly heat the resin frame 11B of the electrode assembly 11 located below to melt the resin of the resin frame 11B so that the separator 12 can join with the electrode assembly 11 located below.

When the electrode assembly 11 before joining is located at the uppermost layer and the separator 12 is located below, laser light R applied along the groove 23a directly heats the resin frame 11B of the electrode assembly 11. This melts the resin of the resin frame 11B so that the electrode assembly 11 can join with the separator 12 located below.

When the separator 12 before joining is located at the uppermost layer and the conductive assembly 16 is located below, laser light R applied along the groove 23a heats the separator 12. This can indirectly heat the resin frame 16B of the conductive assembly 16 located below to melt the resin of the resin frame 16B so that the separator 12 can join with the conductive assembly 16 located below.

When the conductive assembly 16 before joining is located at the uppermost layer and the separator 12 is located below, laser light R applied along the groove 23a directly heats the resin frame 16B of the conductive assembly 16. This melts the resin of the resin frame 16B so that the conductive assembly 16 can join with the separator 12 located below.

Referring to FIGS. 6 to 10B, the following describes a method for manufacturing the fuel cell stack 1 having the above-mentioned structure according to the present embodiment. The method for manufacturing the fuel cell stack 1 of the present embodiment stacks the separator 12, the electrode assembly 11 and the conductive assembly 16 one by one in accordance with the laminated structure of the resultant fuel cell stack 1 to be manufactured and joining them. Specifically to form a single cell 10, the method stacks a separator 12, an electrode assembly 11 and a separator 12 in this order so that the single cell has a stacked structure. Before staking a separator 12 for the next single cell 10 on the stack-structured single cell 10, a conductive assembly 16 for separator 12 is stacked on the separator 12 of the stack-structured single cell 10. Each stacking is followed by joining with laser light in the present embodiment.

Figure 9A:
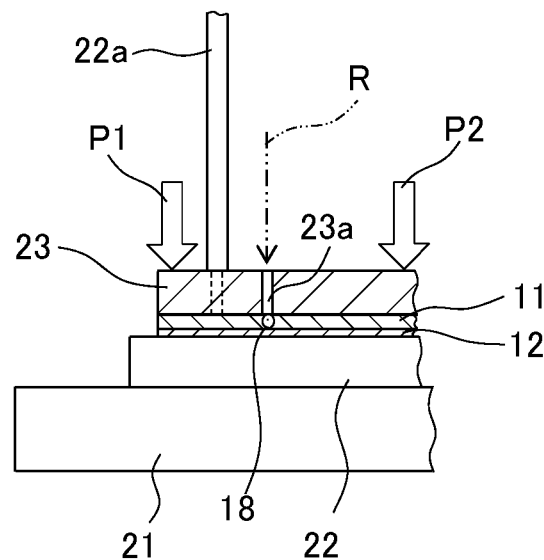
FIG. 9A is a cross-sectional view of a major part showing the pressurizing and joining step of a separator and an electrode assembly.

Firstly as shown in FIGS. 8 and 9A, the mount 22 to place the separator 12 and the electrode assembly 11 is fixed to the XY stage 21 as the base. Then the guide shafts 22a and 22a of the mount 22 are inserted into the guide holes 17 and 17 of the first separator 12 so as to place the first separator 12 on the upper face of the mount 22.

Next the guide shafts 22a and 22a are inserted into the guide holes 17 and 17 of the first electrode assembly 11 so as to place the first electrode assembly 11 on the first separator 12. After that, the guide shafts 22a and 22a are inserted into the guide holes 17 and 17 of the pressurizing member 23, and the pressurizing member 23 is moved downward along the guide shafts 22a and 22a. Then the electrode assembly 11 is pressurized downward by the outer part 23A and the inner part 23B of the pressurizing member 23 by means of the hydraulic cylinders (not illustrated).

Specifically the first electrode assembly 11 is stacked on the first separator 12, and then the pressurizing member 23 pressurizes the first electrode assembly 11 from the above. More specifically the outer part 23A pressurizes the outer part of the first electrode assembly 11 with pressure P1 and the inner part 23B pressurizes the center part of the first electrode assembly 11 with pressure P2. The pressurizing member 23, including a flat plate member, can apply uniform pressure P1 or P2 to the first electrode assembly 11. Although pressure P1 and P2 may be the same, pressure P2 for the inner part 23B may be set smaller because the center part of the first electrode assembly 11 is the electricity-generation section 14.

Next the laser joining device 24 applies laser light R via the groove 23a between the outer part 23A and the inner part 23B of the pressurizing member 23. In the first electrode assembly 11 located above, the resin of the resin frame 11B irradiated with the laser light R melts. As the XY stage 21 moves to apply the laser light R from the laser joining device 24 along the groove 23a, the electrode assembly 11 joins with the first separator 12, and the joining line 18 as the joining part is formed.

The first separator 12 and the first electrode assembly 11 are joined due to the resin of the resin frame 11B that is molten by the laser light R while being pressurized by the pressurizing member 23. The joining at the joining line 18 therefore can be uniform. These first separator 12 and first electrode assembly 11 are kept in position correctly with the guide shafts 22a and 22a, and they can join precisely.

Figure 9B:
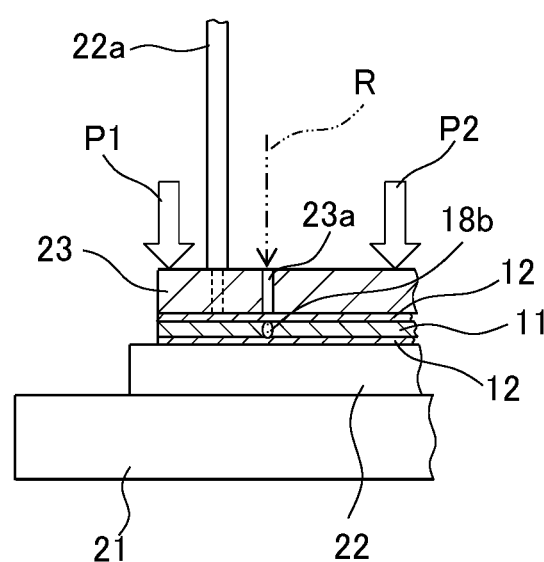
FIG. 9B is a cross-sectional view of a major part showing another pressurizing and joining step of the electrode assembly and a separator after the joining of FIG. 9A.

When removing the pressurizing member 23 from the mount 22, then the first separator 12 and the first electrode assembly 11 joined with the first separator are disposed on the mount 22. Next as shown in FIG. 9B, the method places a second separator 12 on the first electrode assembly 11 from the above of the mount 22. Specifically the guide shafts 22*a* and 22*a* of the mount 22 are inserted into the guide holes 17 and 17 of the second separators 12 so as to place the second separator 12 on the first electrode assembly 11.

After that, the guide shafts 22*a* and 22*a* are inserted into the guide holes 17 and 17 of the pressurizing member 23, and the pressurizing member 23 pressurizes the second separator 12 that is placed on the first electrode assembly 11 with pressure P1 and P2. The method applies laser light R along the groove 23*a* of the pressurizing member 23 so as to melt the resin of the resin frame 11B of the first electrode assembly 11 located below the second separator 12. As the XY stage 21 moves to apply the laser light R from the laser joining device 24 along the groove 23*a*, the second separator 12 joins with the first electrode assembly 11, and the joining line 18 is formed. This can join the second separator 12 located above as well precisely in position and uniformly.

One single cell 10 is manufactured in this way, and after that, the same steps are repeated to stack a separator 12, an electrode assembly 11 and a separator 12 in this order on the single cell one by one, followed by joining. That is, these members are stacked one by one so that the separators 12 and 12 can sandwich the second or later electrode assemblies 11 as well, and they are joined with laser light R while applying pressure to the stacked members. The method can manufacture the fuel cell stack 1 in this way. Note here in the case of the structure without conductive assembly 16, i.e., the structure shown in FIG. 3, a seal member may be disposed along the joining line 18 between the separators 12. This seal member also may be welded to the separator 12 by laser light R.

Figure 10A:
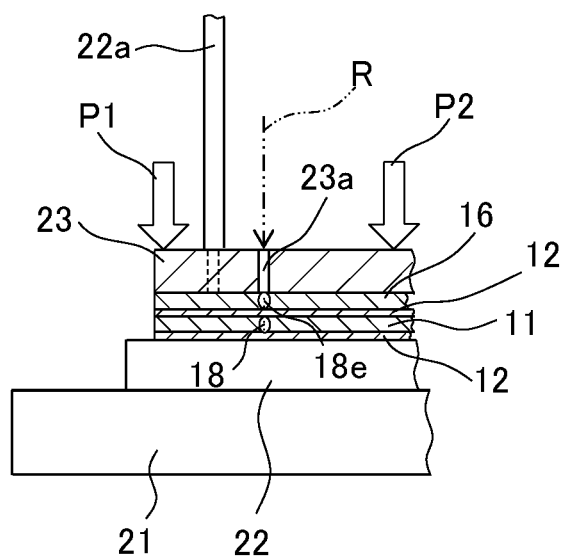
FIG. 10A is a cross-sectional view of a major part showing another pressurizing and joining step of the separator and a conductive assembly after the joining of FIG. 9B.

For the structure including the conductive assembly 16 as in FIG. 5, the method places a first conductive assembly 16 on the second separator 12 as shown in FIG. 10A. After that, the guide shafts 22*a* and 22*a* are inserted into the guide holes 17 and 17 of the pressurizing member 23, and the pressurizing member 23 is moved downward along the guide shafts 22*a* and 22*a*. Then the first conductive assembly 16 is pressurized downward by the outer part 23A and the inner part 23B of the pressurizing member 23 by means of the hydraulic cylinders or the like.

Next while pressurizing the conductive assembly 16 located at the uppermost layer with the pressurizing member 23 uniformly, the method applies laser light R along the groove 23*a* of the pressurizing member 23. This can melt the resin of the resin frame 16B of the conductive assembly 16, so that the conductive assembly 16 joins with the second separator 12.

Figure 10B:
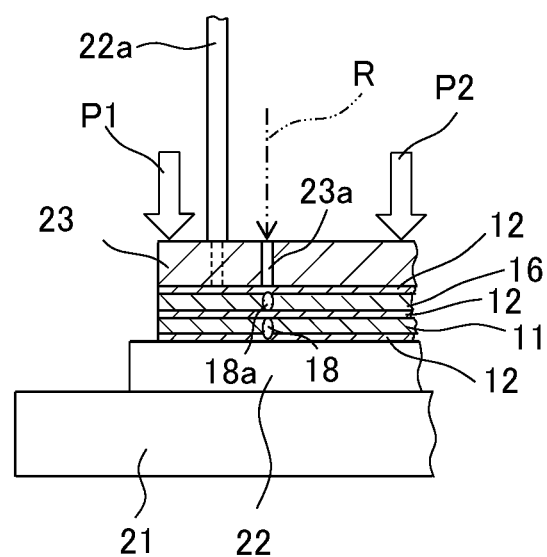
FIG. 10B is a cross-sectional view of a major part showing another pressurizing and joining step of the conductive assembly and a separator after the joining of FIG. 10A.

Next as shown in FIG. 10B, the method further joins a third separator 12 on the conductive assembly 16 located at the uppermost layer at the step of FIG. 10A. This third separator 12 is a part of the single cell 10 to be stacked next.

Specifically the method similarly places the third separator 12 on the conductive assembly 16 and pressurizes the third separator 12 with the pressurizing member 23 uniformly. Then the method applies laser light R along the groove 23*a* of the pressurizing member 23 so as to melt the resin of the resin frame 16B of the conductive assembly 16 via the third separator 12. This can join the third separator 12 with the conductive assembly 16. The method can repeat a series of these steps to manufacture the fuel cell stack 1.

As stated above the method for manufacturing the fuel cell stack 1 of the present embodiment stacks the members of the fuel cell stack including the separators 12 and the electrode assemblies 11 one by one, and applies laser light R along the groove 23*a* of the pressurizing member 23 every time after stacking of each member while uniformly pressurizing it. This allows these members to join one by one uniformly and precisely. Additionally these electrode assemblies 11 and the separators 12 are stacked to form single cells 10 while manufacturing the fuel cell stack 1 as well, and so the fuel cell stack 1 can be manufactured efficiently.

The method of the present embodiment confines the separators 12 or the like with the pressurizing member 23 during joining, which can suppress warping, for example, of the separators 12 due to heat from the laser light R.

Between the separator 12 of one single cell 10 and the separator 12 of the next single cell 10, the conductive assembly 16 may be disposed between these separators 12 for joining as shown in FIGS. 10A and 10B. The following advantageous effects can be expected from this structure. Specifically the conductive assembly 16 includes the conductive member 16A, which can establish continuity between the separators 12 and 12 of the single cells 10 disposed on both sides of the conductive assembly. The resin frame 16B of the conductive assembly 16 has a shape similar to that of the resin frame 11B of the electrode assembly 11, whereby the number of components can be reduced, and so the fuel cell stack 1 can be manufactured at lower cost.

That is a detailed description of one embodiment of the present disclosure. The present disclosure is not limited to the above-stated embodiments, and the design may be modified variously without departing from the spirits of the present disclosure defined in the attached claims.

For instance, instead of joining with laser light R while precisely moving the mount 22 by means of the XY stage, the manufacturing device 20 may be configured so that the laser joining device 24 can move along the groove 23*a* of the pressurizing member 23 for joining without using the XY stage.

DESCRIPTION OF SYMBOLS

1 Fuel cell stack
10 Single cell
11 Electrode assembly
11A Membrane electrode assembly
11B Resin frame
11*a* Polymer electrolyte membrane
11*d* Gas diffusion layer
12 Separator
14 Electricity-generation section
15*a* First opening
15*b* Second opening
15*c* Third opening
16 Conductive assembly
16A Conductive member
16B Resin frame
17 Guide hole
18 Joining line (joining part)
20 Manufacturing device
21 XY stage
22 Mount
22*a* Guide shaft
23 Pressurizing member
23A Outer part
23B Inner part
24 Laser joining device
R Laser light

What is claimed is:
1. A method for manufacturing a fuel cell stack including a laminate of a plurality of single cells, each single cell including an electrode assembly sandwiched between a pair of separators, the electrode assembly including: a membrane electrode assembly having two faces on each of which a gas diffusion layer is disposed; and a resin frame that is fixed to the membrane electrode assembly so as to wrap around a periphery of the membrane electrode assembly, the method comprising: for a first single cell of the plurality of single cells, stacking a first separator of the pair of separators, the electrode assembly and a second separator of the pair of separators, in this order so that each electrode assembly is sandwiched by the first separator and the second separator, and repeating the stacking for each other single cell of the plurality of single cells, so as to manufacture the fuel cell stack, wherein the method further includes, for each single cell: pressurizing the electrode assembly stacked on the first separator and applying laser light from a laser joining device to the electrode assembly to melt resin of the resin frame to join the electrode assembly to the first separator on a mount, the pressurizing including pressurizing the first separator and the electrode assembly by a pressurizing member including an outer part and an inner part, laser light from the laser joining device being applied via grooves between the outer part and the inner part of the pressurizing member, thereby joining the first separator and the electrode assembly, and pressurizing the second separator stacked on the electrode assembly and applying laser light from the laser joining device to the second separator to melt resin of the resin frame via the second separator to join the second separator to the electrode assembly on the mount, the pressurizing including pressurizing the electrode assembly and the second separator by the pressurizing member including the outer part and the inner part, laser light from the laser joining device being applied via the grooves between the outer part and the inner part of the pressurizing member, thereby joining the electrode assembly and the second separator; wherein the method further includes inserting guide shafts of the mount into guide holes formed in the first separator, the electrode assembly and the second separator, respectively.

2. The method for manufacturing a fuel cell stack according to claim 1, wherein the method further includes joining the second separator of one of the plurality of single cells to the first separator of an adjacent one of the plurality of single cells via a conductive assembly, the conductive assembly includes a conductive member and a resin frame that is fixed to the conductive member so as to wrap around periphery of the conductive member, the method further includes pressurizing the conductive assembly stacked on the second separator of the one of the plurality of single cells and applying laser light to the resin frame of the conductive assembly to join the resin frame of the conductive assembly with the second separator of the one of the plurality of single cells, and the method further includes pressurizing the first separator of the adjacent one of the plurality of single cells on the conductive assembly and applying laser light to the separator to join the first separator of the adjacent one of the plurality of single cells with the resin frame of the conductive assembly.

3. The method for manufacturing a fuel cell stack according to claim 1, wherein the first separator, the electrode assembly and the second separator are individually placed on the mount in this order repeatedly, and a fuel cell is prepared one by one on the mount.

* * * * *